Aug. 26, 1947.   D. D. GRIEG   2,426,204

DISCRIMINATOR CIRCUIT

Filed Sept. 11, 1944

INVENTOR.
DONALD D. GRIEG

BY
R P Morris
ATTORNEY

Patented Aug. 26, 1947

2,426,204

UNITED STATES PATENT OFFICE 2,426,204

DISCRIMINATOR CIRCUITS

Donald D. Grieg, Forest Hills, N. Y., assignor to Federal Telephone and Radio Corporation, New York, N. Y., a corporation of Delaware Application September 11, 1944, Serial No. 553,569

7 Claims. (Cl. 250—27)

This invention relates to discriminator circuits and more particularly to discriminator circuits serving as translators for time modulated pulse trains.

Systems have been proposed for transmitting signals by means of pulse trains wherein alternate pulses of the pulse trains recur at a substantially uniform repetition frequency and in which the time spacing between successive pulses is varied in accordance with applied signals. The applied signals may be normal voice or other audio signals or they may be a variation in spacing for other purposes such as for directional indication as shown, for example, in a copending application of Emile Labin and the present inventor, Serial No. 532,724, filed April 26, 1944. With such wave trains, the odd and even harmonic content of the pulse train wave varies with a variation in the spacing of the successive pulses. Accordingly, a measure of the pulse spacing and a consequent translation of the signal may be obtained from the amplitudes of selected odd and even harmonics.

It is an object of this invention to provide a translator circuit for translating the variation in spacing of pulses of a pulse train such as outlined above to provide a translation of the signals producing this variation.

It is a further object of my invention to provide a translator circuit of a type referred to above wherein a full 180° rotation of a visual indicator may be readily obtained.

It is a still further object of my invention to provide a translation circuit of the type defined above for reproducing audible signals with a greater linearity than has been provided in previous forms of demodulating translators.

According to a feature of my invention, I provide means for selecting an odd and even harmonic from a wave train of the type defined above, and output rectifier means for separately rectifying these selected harmonics to produce output voltages proportional to the amplitude of these harmonics. When a visual meter scale is to be provided, a separate set of biasing rectifiers is provided together with a common biasing resistor so that the output rectifiers will be biased to an intermediate mid-point. As a consequence, the output signals will vary between positive and negative values in each of two meter coils so that the meter pointer may be moved through a 180° arc.

When the circuit is used as a demodulator, a selected odd and even harmonic is applied across separate rectifier tubes to impedance means. A reproducer is coupled to this impedance means so that the output will depend substantially on the sum of the two rectified harmonics thus producing an output wave of signal frequency having a greater linearity than if a single harmonic selector were used.

A better understanding of my invention and the objects and features thereof may be had from the particular description of embodiments thereof made with reference to the accompanying drawing, in which.

Figure 1:
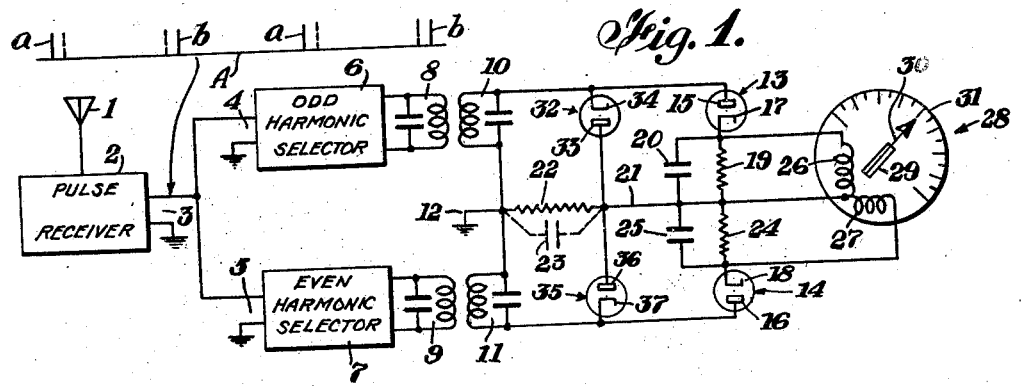
Fig. 1 is a schematic circuit diagram partly in block form illustrating the principles of my invention applied to an indicating meter.

Turning first to Fig. 1, an incoming wave train A of the type in which alternate pulses $a$ are spaced substantially equal distances apart to provide a substantially constant repetition frequency and in which successive pulses $a$, $b$ are spaced apart variable distances in accordance with the signal, is applied to a receiving antenna 1. This energy is received in pulse receiver 2 and detected therein to remove the radio frequency. The output pulse train is then applied over line 3 and branch lines 4 and 5 to odd harmonic selector 6 and even harmonic selector 7, respectively. The order of harmonic chosen is an inverse function of the pulse displacement and is given by the approximate relation:

$$n = \frac{T}{2t}$$

where $n$ = Order of harmonic
$t$ = Total pulse displacement
$T$ = Base pulse period (alternate pulses)

It will be clear that when the pulses are all equally spaced, only even harmonics of the alternate pulse repetition rate will be present. Similarly, when the pulses are displaced in the other extreme position only odd harmonics of the alternate pulse repetition rate will be present. Intermediate these limiting points, the odd and even harmonics will both be present but of different amplitudes depending on the departure from the limiting values. Accordingly, harmonic selectors 6 and 7 are each adjusted to a predetermined one of the odd and even harmonics, respectively. Output circuits 8 and 9 of selectors 6 and 7, respectively, are tuned to the corresponding selected harmonic and feed into tuned translator input circuits 10 and 11, respectively, which are grounded at a common point 12. The odd selected harmonic input circuit 10 serves to apply this selected harmonic to an output rectifier 13 while the input circuit 11 applies the selected even harmonic to an output rectifier 14. Rectifiers 13 and 14 are provided with anodes 15 and 16 and cathodes 17 and 18, respectively. The output circuit for rectifier 13 includes a cathode resistance 19 which may be shunted by a fixed condenser 20 to smooth out the rectified output energy connected over a lead line 21 and a biasing resistor 22 to common ground point 12. Resistor 22 preferably has sufficient inherent capacity as indicated by the dotted line condenser 23 substantially to smooth out rectified energy flowing thereover or an actual condenser may be used therein. The output circuit of rectifier 14 comprises a cathode-resistor 24 shunted by condenser 25, common lead 21 and resistor 22. Across output impedances 19 and 24 are connected right angularly arranged meter coils 26 and 27 respectively, of indicating meter 28. A permanent magnet 29 is rotatably mounted in the field of coils 26 and 27 so that it will take a resultant position dependent upon the relative strengths of the fields of these coils. A pointer 30 cooperative with a calibrated scale 31 is preferably provided to supply an indication of the relative strengths of these fields.

It is clear that with a simple rectified output the currents in coils 26 and 27 would merely vary between zero and some positive value. As a consequence, magnet 29 and indicator 30 could then only travel through a 90° indicating arc. However, if a negative bias is applied to rectifiers 13 and 24, then the currents in coils 26 and 27 will vary between positive and negative values providing a 180° displacement of pointer 30. In order to supply this bias without the necessity of additional voltage means and to have this bias value varied in accordance with the average amplitude of the received energy, I provide a rectifier 32 having an anode 33 and a cathode 34 coupled between the junction point of lines 21 and 22 and the connection to anode 15 of output rectifier 13 and a similar rectifier 35 provided with an anode 36 and a cathode 37 coupled between the junction point of conductor 21 and resistor 22 and the anode of rectifier 14. It will be noted that rectifiers 32 and 35 are connected in the opposite direction to output rectifiers 13 and 14. As a consequence, a substantially uniform voltage drop will occur in resistor 22 regardless of the variation in amplitudes between the selected odd and even harmonics since when the amplitude of one harmonic increases the other decreases and vice versa, thus maintaining a steady negative bias at the junction of elements 19 and 24. It will be realized that rectifiers 13 and 14 also will tend to provide a voltage drop through resistor 22 which drop would be positive. However, since the output from rectifiers 13 and 14 is applied across resistors 19 and 22, and 24 and 22, respectively, in series, this voltage drop across resistor 22 will be less than that provided by rectifiers 32 and 35. Accordingly, there will be a resultant negative bias voltage applied across rectifiers 13 and 14. The relative values of resistors 19, 22 and 24 are so chosen that the desired bias is provided for the output rectifiers 13 and 14. This bias will vary up and down in accordance with the average energy level of received energy, but will remain substantially constant during signal variations. The shift in the zero axis, which results due to this bias, is indicated by line c of Fig. 3. Therefore, the voltage swing in the coils of meter 2 will be provided to achieve the desired 180° movement of the indicator pointer.

Figure 2:
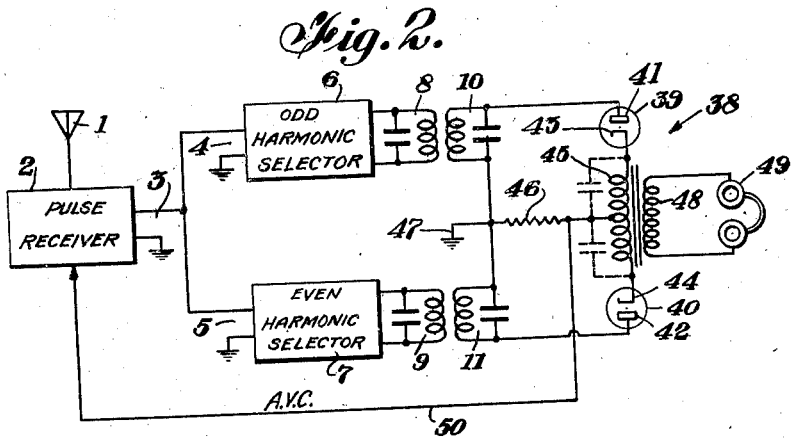
Fig. 2 is a schematic diagram partly in block form illustrating the principles of my invention applied to a demodulating receiver.

Turning now to Fig. 2, the incoming wave in which the spacing between adjacent pulses is varied in accordance with the modulating signals and is applied over antenna 1, pulse receiver 2, line 3 and branch lines 4 and 5 to odd harmonic selector 6 and even harmonic selector 7, respectively. The outputs of harmonic selectors 6 and 7 are applied over tuned output circuits 8 and 9 to similarly tuned input circuits 10 and 11 of the translator circuit 38. A pair of rectifiers 39 and 40 having anodes 41, 42 and cathodes 43, 44, respectively, are coupled to input circuits 10 and 11. A rectifier output impedance coil 45 grounded at its mid-point over resistive connector 46 to ground 47 is provided. Coupled to impedance coil 45 by means of coil 48 is shown a reproducer indicator 49. An automatic volume control lead 50 is provided from one end of resistor 46 to pulse receiver 2 to control the level of the received signals. If this automatic volume control is not desired, resistor 46 and lead 50 may be omitted. Condensers indicated by dotted lines are shown connected across the split transformer windings. These condensers serve a similar purpose as described for condensers 20, 25, of Fig. 1 (i. e. by-passing of the harmonic frequency energy), except in this case the time constants involved are made sufficiently small in order to present sufficient impedance for the demodulated voice frequency currents.

Figure 3:
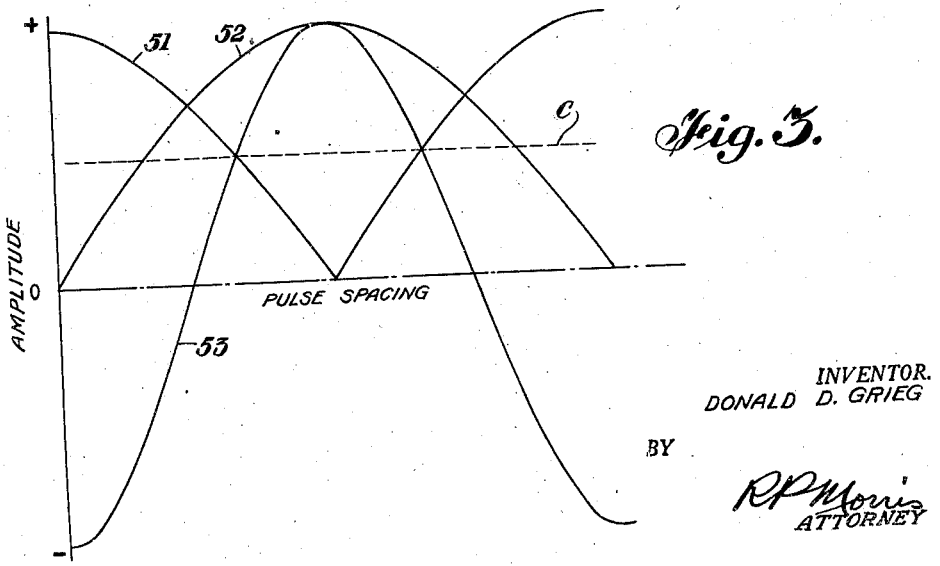
Fig. 3 is a graphical representation illustrating the response obtained from the circuit of Fig. 2.

Turning now to Fig. 3, the operation of the circuit of Fig. 2 will be more clearly explained. Assuming that the pulse spacing varies along the horizontal line of Fig. 3 and that at zero the pulses are evenly spaced then the amplitude of the even harmonics selected may vary in accordance with curve 51. Similarly, the amplitude of the selected odd harmonic will vary in accordance with curve 52. It is clear, therefore, that from either of these selected harmonics a wave variable in amplitude in accordance with pulse spacing may be produced in reproducer 49 of Fig. 2. However, by providing the connection as shown in Fig. 2, in which these two output signals are added in opposed phase relationship, the output at reproducer 49 will follow generally the form shown in curve 53. It will be seen that this curve has substantially twice the amplitude swing of either curves 51 or 52 but also swings through this double amplitude in substantially the same time as either of these single waves. As a consequence, the output energy will have a greater linearity than would be present were this simple demodulating circuit used.

It is clear that the simple diagrammatic circuits illustrated are only two of many examples which will readily present themselves to one skilled in the art. The specific illustration and examples given herein are to be considered only by way of illustration and not as a limitation on the scope of my invention as set forth in the objects thereof and the accompanying claims.

I claim:

1. A translator circuit for producing an indication in accordance with variations in time displacement of successive pulses of a pulse train, the alternate pulses of said train having a substantially constant repetition frequency, comprising means for selecting from said pulse train waves of a given even and a given odd harmonic of said repetition frequency, rectifiers for each of said selected harmonics, input circuit means for separately applying said selected harmonics to corresponding ones of said rectifiers, output impedance means for each of said rectifiers connected to a common point, a common resistor means connected between said common point and a common point on said input circuit means, and other rectifiers coupled in opposed polarity relation with respect to said output rectifiers and in shunt relationship to the associated input circuits and said common resistance to provide a biasing voltage drop in said common resistance for said output rectifiers.

2. A circuit according to claim 1, further comprising first and second meter coils coupled across respective ones of said output impedance means, and mounted normal to one another, and a rotatably mounted magnet indicator mounted in the common fields of said meter coils.

3. A translator circuit for reproducing a signal from a received pulse train in which the time spacing between adjacent pulses varies in accordance with signals and the alternate pulses of said train have substantially constant repetition frequency, comprising means for selecting from said pulse train waves of a given even and a given odd harmonic of said repetition frequency, rectifiers for each of said selected harmonics, an output impedance means connected between said rectifiers, a ground connection to the mid-point of said output impedance means, and a signal reproducing means coupled to said output impedance means.

4. A circuit according to claim 3, further comprising a resistance means in said ground connection across which a substantially constant voltage dependent upon the received signal is produced, and volume control means for said translator circuit controlled by said substantially constant voltage.

5. A translator circuit for translating indicating signals comprising component waves varying in relative amplitude in accordance with different indications, comprising means for selecting from said signal waves said component waves of varying amplitude, separate rectifier means having output circuits for rectifying said separated waves, common resistor means in the output circuits of said rectifiers, a translator coupled to receive the output energy of said rectifier means for producing a translation of said signals, and means for utilizing the potential drop in said common resistor to control said translator circuit.

6. A translator circuit for indicating signals comprising component waves varying in relative amplitude in accordance with different indications, comprising means for selecting from said signal waves components of said varying amplitude, separate rectifier means for rectifying said separate components, output circuits for said rectifier means comprising an inductance coil coupled between said rectifiers and resistor means for grounding the midpoint of said coil, and an audio signal reproducing means coupled to said coil for producing a translation of said signals.

7. A translator circuit for translating indicating signals, comprising component waves varying in relative amplitude in accordance with different indications comprising means for selecting from said signal wave component waves of varying amplitude, separate rectifier means having output circuits for rectifying said separated waves, biasing means for said rectifiers comprising a common resistor in the output circuits of said rectifier means, and other rectifier means connected across the input of said first-named rectifier means to produce a biasing drop in said common resistor, and a translator coupled to receive the output energy of said first-named rectifier means for producing a translation of said signals.

DONALD D. GRIEG.